Figures 1, 2:
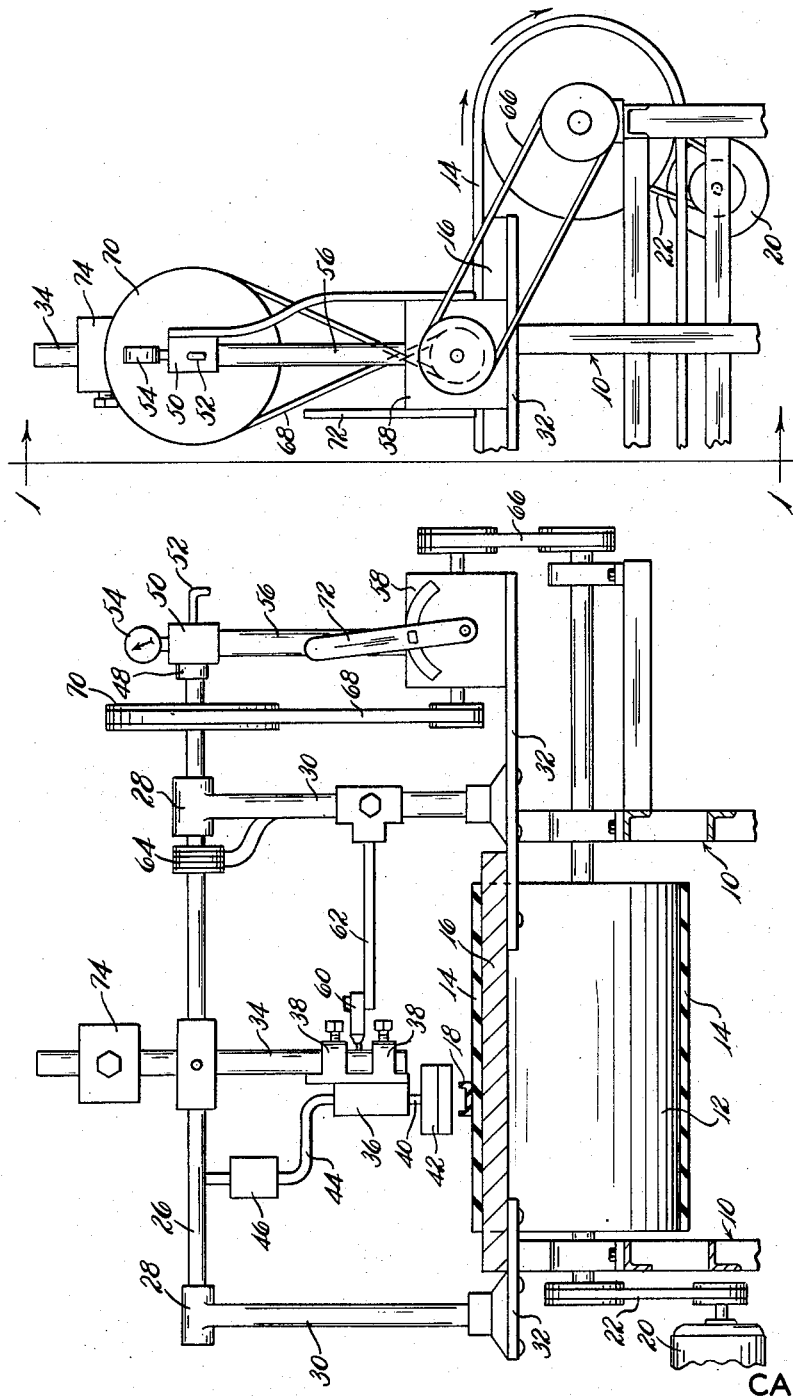

Dec. 29, 1964 C. E. BELL 3,163,070
INTERRELATED WEB FEED AND TOOL DRIVE MEANS
Filed March 29, 1963

INVENTOR.
CARL E. BELL
BY
Oldham & Oldham
ATTYS.

United States Patent Office 3,163,070
Patented Dec. 29, 1964

3,163,070
INTERRELATED WEB FEED AND TOOL DRIVE MEANS
Carl E. Bell, Rte. 1, Box 258, Garrettsville, Ohio
Filed Mar. 29, 1963, Ser. No. 269,041
3 Claims. (Cl. 83—311)

This invention relates to apparatus for marking and/or cutting into selected but different lengths elongated articles of rubber-like material when carried upon a moving conveyor.

Apparatus has been provided heretofore for cutting or marking rubber-like articles received upon a moving conveyor from an extrusion or similar apparatus. However known cutting and marking apparatus has not readily been adapted for cutting and making the materials without interrupting the movement of the conveyor or of the materials on the conveyor. Additionally, known apparatus is not quickly adapted to change in length of the articles cut or marked. Also, known apparatus has been relatively complicated or expensive and is normally not adapted to the cutting or marking of light weight simple materials, such as extruded gaskets of rubber-like material.

It is the general object of the invention to avoid the foregoing and other difficulties of and objections to prior art practices by the provision of cutting apparatus of the character described which is relatively inexpensive and easily operated, and which is capable of performing over long periods with little or no attention or maintenance.

Another object of the invention is to provide apparatus such as described characterized by a relatively simple adjustment for changing the length of the articles cut or marked without stopping the conveyor or the operation of the cutting apparatus.

Another object of the invention is to provide apparatus particularly adapted to the automatic cutting of extruded rubber strips, such as gaskets, and substantially to any length desired while moving in a relatively rapid manner upon a conveyor.

The foregoing objects of the invention, and other objects which will become apparent as the description proceeds, are achieved by the provision of apparatus for cutting rubber stock and the like and including a conveyor for the stock, means for driving the conveyor, cutter means mounted for rotation in the direction of the conveyor movement about an axis transverse to the conveyor, means for separately moving the cutter means toward and from the conveyor, means for rotatably driving the cutter means, means for adjusting the speed of rotation of the cutter means in relation to the speed of movement of the conveyor, and means for controlling the operation of the separate means for moving the cutter means with a cutting stroke towards the conveyor.

For a better understanding of the invention reference should be had to the accompanying drawings, wherein:

FIGURE 1 is a vertical sectional view, taken substantially on line 1—1 of FIGURE 2 and illustrating one best known embodiment of the principles of the invention; and FIGURE 2 is a side elevation of the apparatus of FIGURE 1, with the major portion of the conveyor being broken away.

In the drawings, the numeral 10 indicates generally a base frame, usually made of angle iron and adapted to rotatably support a pair of pulleys 12, only one of which is shown, the pulleys being carried on spaced apart horizontal axes and adapted to carry between them a flat rubberized fabric conveyor belt 14 which is endless, with the top reach of the belt being slidably carried upon a flat metal plate 16 mounted upon the frame 10.

The conveyor belt 14 is adapted to continuously receive from an extruder or other piece of manufacturing equipment (not shown) a strip of rubber or rubber-like material, such as a gasket 18 adapted to be cut into selected lengths by the apparatus of the invention. The conveyor belt 14 is driven in the direction of the arrows by means of a motor 20 mounted on the frame 10 and connected by a suitable drive 22 to one of the pulleys 12 in the manner illustrated in the drawings.

Coming now to the cutting mechanism this includes a rotatable shaft 26 positioned transversely of the conveyor 14 and spaced vertically above the conveyor. The shaft 26 may be rotatably carried in bearings 28 fixed to posts 30 mounted upon plates 32 secured to the plate 16 slidably supporting the conveyor belt 14. The shaft 26 carries a bracket 34 extending radially from the shaft, the bracket having secured thereto an air motor 36 by means of adjustably positioned clamps 38. The air motor 36 has a piston rod 40 extending towards the conveyor, with the rod 40 carrying a cutting knife 42 which extends transversely of the conveyor 14. A conduit 44 extends from the air motor 36 to a solenoid-operated valve 46 carried by the shaft 26. The valve 46 is connected to a hollow bore in the shaft 26 which extends out to a rotary-stationary fluid joint 48, the stationary portion thereof being connected to a pressure regulator 50 in turn connected to an air pressure supply line 52. A gauge 54 connected to the pressure regulator 50 indicates the air pressure supplied to the air motor 36 and thereby the force of the operating stroke of the motor whereby the desired cutting or marking stroke can be achieved.

The pressure regulator 50 is rigidly carried upon a bracket 56 connected to a variable speed reducer 58 mounted upon an extension of the bracket 32. The operation of the solenoid valve 46 is cotrolled by means of a microswitch 60 mounted upon a bracket 62 adjustably carried by one post 30, with the microswitch when struck by the bracket 34 closing to supply electric current from a source (not shown) through slip rings 64 to the solenoid of valve 46 to operate the valve and supply operating air to the air motor 36.

The shaft 26 is adapted to be rotated at an adjustable and controllable rate in relation to the forward movement of the conveyor 14. This is conveniently achieved by driving the variable speed reducer 58 from the shaft of one pulley 12 by V-belt or other driving means 66. The output of the speed reducer 58 is connected by a crossed belt 68 with a pulley 70 secured to the shaft 26. The speed reducer 58 has an adjusting handle 72 which can be manually positioned to give any desired ratio between the rotation of the shaft 26 and the speed of the conveyor.

The weight of the bracket 34 and all of the mechanism carried thereby may be counterbalanced by an adjustable weight 74, as will be understood. It should also be noted that two brackets 34 can be utilized with a pair of air motors 36 carrying a cutter blade between them if the apparatus of the invention is to be employed with a wide conveyor or if the cutter is to be used with relatively wide material to be cut. The air motor 36 has spring return means for the piston rod 40 and the cutter 42, but can also be of the air return type should this be found desirable.

In the operation of the apparatus it will be understood that a length of material 18 is continuously fed onto the conveyor 14, with the cutter 42 being rotated in the same direction as the movement of the conveyor so that during the cutting operation of the cutter there is often very little difference between the speed of the conveyor and the speed of the cutter. Then as the bracket 34 moves the cutter 42 down towards the material the bracket 34, when substantially vertical, strikes the microswitch 60 to operate the solenoid of valve 46 thereby causing air to be supplied from supply 52 to the air motor 36 which rapidly drives the cutter 42 down against the material 18 on the conveyor to cut it into a length. The effective length of the stroke of the cutter 42 can be adjusted by positioning the clamps 38 on the bracket 34 so that the cutter will only engage with the top of the material 18 to mark it rather than to cut completely through it. Also, the air pressure supplied to the air motor 36 can be adjusted by the pressure regulator 50 to control the strength and force of the cut so that exactly the marking or cutting action desired can be obtained. If a cutting operation is to be performed the effective length of the stroke of the cutter 42 is adjusted by repositioning clamps 38 so as to bring the cutting edge of the cutter down through the material 18 and to just engage at the end of the cutting stroke with the surface of the conveyor 14.

Now if it is desired to change the length of the material cut without stopping the operation of the conveyor 14 or the cutting of the material it is possible to readjust the handle 72 on the speed reducer 58 so that a selected length of material is cut upon each rotation of the shaft 26. Of course, any extensive repositioning of the handle 72 to produce considerably different cut lengths of the material 18 increases the difference in forward speed of the conveyor 14 and the rotary forward speed of the cutter 42, but this often found not objectionable for the reason that the movement of the cutter 42 into and out of the material during the cutting action is so rapid that the difference in the forward speeds of the conveyor and the cutter causes no difficulty.

Changing the position of the handle 72 does not change the speed of the conveyor 14 but only the length of the cut on the material 18. To change the speed of the conveyor 14 the speed of the motor 20 must be changed which in no way changes the length of the cut on the material 18 but which changes the number of cuts per minute. Thus, the motor 20 can be run slow until the cut is adjusted to the desired length and thereafter speeded up.

While a certain representative embodiment and details have been shown for the purpose of illustrating the invention, it will be apparent to those skilled in this art that various changes and modifications may be made therein without departing from the spirit or scope of the invention.

What is claimed is:

1. The combination in apparatus for marking or cutting continuous lengths of rubber-like materials of an enless conveyor adapted to receive and carry the material, means for driving the conveyor, a shaft, means journalling the shaft transversely of the conveyor in a position above the conveyor and spaced from the end of the conveyor receiveing the material, drive means connecting the shaft and the means for driving the conveyor to rotate the shaft, adjustable means in said drive means for selectively changing the relative rate of rotation of the shaft and the speed of the conveyor, bracket means extending radially from the shaft towards the conveyor, air cylinder means fixed to the bracket means and having piston rod means extending towards the conveyor, cutter means carried by the piston rod means, means for supplying air to the air cylinder means, means for controllably regulating the pressure of the air supplied to the air cylinder means, a solenoid operated valve in the means for supplying air, a microswitch for controlling the operation of the solenoid operated valve, means for adjustably mounting the switch so it is controllably operated at a selected predetermined relation to the material upon each rotation of the shaft to thereby cause the cutter means to move against the material on the conveyor to cut or mark it, means on the shaft for adjustably counterbalancing the weight of the bracket means, the air cylinder means, and the cutter means, and means for adjusting the length of the stroke of the cutter means towards the material.

2. The combination in apparatus for marking or cutting continuous lengths of rubber-like materials on an endless conveyor adapted to receive and carry the material, means for driving the conveyor, a shaft, means journalling the shaft transversely of the conveyor in a position above the conveyor and spaced from the end of the conveyor receiving the material, drive means connecting the shaft and the means for driving the conveyor to rotate the shaft, adjustable means in said drive means for selectively changing the relative rate of rotation of the shaft and the speed of the conveyor, bracket means extending radially from the shaft towards the conveyor, air cylinder means fixed to the bracket means and having piston rod means extending towards the conveyor, cutter means carried by the piston rod means, means for supplying air to the air cylinder means, means for adjustably controlling the pressure of air supplied to the air cylinder means, a solenoid operated valve in the means for supplying air, a microswitch for controlling the operation of the solenoid operated valve, means for mounting the switch so it is operated by the rotation of the shaft to thereby cause the cutter means to move against the material on the conveyor to cut or mark it, means on the shaft for adjustably counterbalancing the weight of the bracket means, the air cylinder means, and the cutter means, and means to adjust the position of the cutter means on the bracket means thereby adjusting the length of the stroke of the cutter means towards the material.

3. The combination in apparatus for marking or cutting continuous lengths of rubber-like materials of an endless conveyor adapted to receive and carry the material, means for driving the conveyor, a shaft, means journalling the shaft transversely of the conveyor in a position above the conveyor and spaced from the end of the conveyor receiving the material, drive means connecting the shaft and the means for driving the conveyor to rotate the shaft, adjustable means in said drive means for selectively changing the relative rate of rotation of the shaft and the speed of the conveyor, bracket means extending radially from the shaft towards the conveyor, air cylinder means fixed to the bracket means and having piston rod means extending towards the conveyor, cutter means carried by the piston rod means, means for supplying air to the air cylinder means, a solenoid operated valve in the means for supplying air, a microswitch for controlling the operation of the solenoid operated valve, and an arm mounted to said means journalling the shaft transversely of the conveyor adjustable vertically and radially thereto operatively mounting the switch so it is operated by the rotation of the shaft to thereby cause the cutter means to move against the material of the conveyor to cut or mark it.

References Cited by the Examiner

UNITED STATES PATENTS

| | | | |
|---|---|---|---|
| 1,075,836 | 10/13 | Lorenz | 83—338 |
| 2,692,646 | 10/54 | Eaton | 83—298 |
| 3,095,803 | 7/63 | Linderoth | 83—639 |

ANDREW R. JUHASZ, *Primary Examiner.*